United States Patent
Sahter et al.

(10) Patent No.: US 12,132,721 B1
(45) Date of Patent: *Oct. 29, 2024

(54) BI-DIRECTIONAL FEDERATION LINK FOR SEAMLESS CROSS-IDENTITY SSO

(71) Applicant: INTUIT INC., Mountain View, CA (US)

(72) Inventors: Snezana Sahter, Mountain View, CA (US); Kumar Govind Jha, Bangalore (IN); Saurabh Mistry, Bangalore (IN); Mukesh Garg, Bangalore (IN); Sivaraman Sathyamurthy, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/490,726

(22) Filed: Oct. 19, 2023

Related U.S. Application Data

(63) Continuation of application No. 18/299,702, filed on Apr. 12, 2023, now Pat. No. 11,831,633.

(51) Int. Cl.
    *H04L 9/40* (2022.01)
(52) U.S. Cl.
    CPC ...... *H04L 63/0815* (2013.01); *H04L 63/0807* (2013.01)
(58) Field of Classification Search
    CPC .................. H04L 63/0815; H04L 63/0807
    See application file for complete search history.

(56) References Cited

U.S. PATENT DOCUMENTS

| | | | | |
|---|---|---|---|---|
| 7,953,979 | B2* | 5/2011 | Borneman | H04L 67/53 713/176 |
| 9,407,583 | B2* | 8/2016 | Ross | H04L 51/04 |
| 10,454,762 | B2* | 10/2019 | Bellan | H04L 65/60 |
| 10,476,733 | B2* | 11/2019 | Tamura | G06F 16/9574 |
| 2009/0119763 | A1* | 5/2009 | Park | H04L 63/0815 726/8 |
| 2011/0231919 | A1* | 9/2011 | Vangpat | H04L 63/0815 726/8 |
| 2012/0036566 | A1* | 2/2012 | Nicholson | H04L 63/126 714/48 |
| 2012/0185391 | A1* | 7/2012 | Sirota | G06Q 20/40 726/8 |
| 2012/0216267 | A1* | 8/2012 | Austel | H04L 67/563 726/8 |
| 2013/0160105 | A1* | 6/2013 | Huang | G06F 21/604 726/8 |
| 2013/0254847 | A1* | 9/2013 | Adams | G06F 21/6218 726/4 |

(Continued)

*Primary Examiner* — Yonas A Bayou
(74) *Attorney, Agent, or Firm* — DLA Piper LLP US

(57) ABSTRACT

A federation link is used to facilitate bi-directional identity federation between software applications. The federation link is created to include user and account identity information for software applications having respective authentication providers. The federation link is created by one of the software applications and shared, for example, with the authentication provider of the other software application. The federation link can be utilized by both software applications to facilitate automated user authentication when navigating in either direction between the software applications.

20 Claims, 7 Drawing Sheets

(56) References Cited

U.S. PATENT DOCUMENTS

2014/0337954 A1* 11/2014 Ahmed ............... H04L 63/0815
                                                                    726/8
2015/0237041 A1*  8/2015 Flamini ............... H04L 63/0823
                                                                    726/10

* cited by examiner

US 12,132,721 B1

BI-DIRECTIONAL FEDERATION LINK FOR SEAMLESS CROSS-IDENTITY SSO

CROSS REFERENCE TO RELATED APPLICATIONS

This application is a continuation of U.S. application Ser. No. 18/299,702 filed Apr. 12, 2023. The above-listed application is incorporated herein by reference in its entirety.

BACKGROUND

In a world where business grows inorganically via multi-billion-dollar acquisitions, it is critical to accelerate the integrating of acquired products to unlock customer and business value. Identity federation allows users to seamlessly access federated applications without having to re-authenticate again when crossing over between products. Typical federation, however, is unidirectional, with one authentication system taking the role of primary authentication provider and another authentication system acting as a relying party. It solves for only one direction of navigating from Application A (working with the primary authentication system) to Application B (working with the relying authentication system). As a result, when the user navigates from Application B to Application A, the user would have to sign-in again on the Application A side. As such, a significant improvement in identity federation is therefore desired.

SUMMARY

Embodiments disclosed herein solve the aforementioned technical problems and may provide other technical solutions as well. Contrary to conventional techniques that implement unidirectional identity federation, one or more embodiments disclosed herein implement bidirectional identity federation.

An example embodiment includes a method performed by a processor. The method may comprise receiving, by an authentication provider associated with a source application, a request from a destination application to access a user ID token of a user navigating from the source application to the destination application, and initiating, by the authentication provider, a federation protocol to retrieve the user ID token. The method may also comprise transmitting, by the authentication provider, the user ID token to the destination application indicating that the user is authenticated by the authentication provider, and creating, by the destination application, a federation link linking destination application authentication credentials of the user to source application authentication credentials of the user. The method may also comprise sharing, by the destination application, the federation link with the source application to facilitate automated authentication when navigating from the destination application to the source application.

An example embodiment includes a system comprising a non-transitory storage medium storing computer program instructions, and one or more processors configured to execute the computer program instructions to cause operations. The operations may comprise receiving, by an authentication provider associated with a source application, a request from a destination application to access a user ID token of a user navigating from the source application to the destination application, and initiating, by the authentication provider, a federation protocol to retrieve the user ID token. The operations may also comprise transmitting, by the authentication provider, the user ID token to the destination application indicating that the user is authenticated by the authentication provider, and creating, by the destination application, a federation link linking destination application authentication credentials of the user to source application authentication credentials of the user. The operations may also comprise sharing, by the destination application, the federation link with the source application to facilitate automated authentication when navigating from the destination application to the source application.

An example embodiment includes a method performed by a processor. The method may comprise determining, by an authentication provider associated with a source application, to deactivate a federation link linking destination application authentication credentials of a user to source application authentication credentials of the user, where the federation link facilitating automated authentication when navigating from the destination application to the source application. The method may also comprise locating, by the authentication provider, the federation link in a database, and deactivating, by the authentication provider, the federation link, where the deactivated federation link prevents the automated authentication when navigating from the destination application to the source application.

DETAILED DESCRIPTION OF SEVERAL EMBODIMENTS

Figure 1:
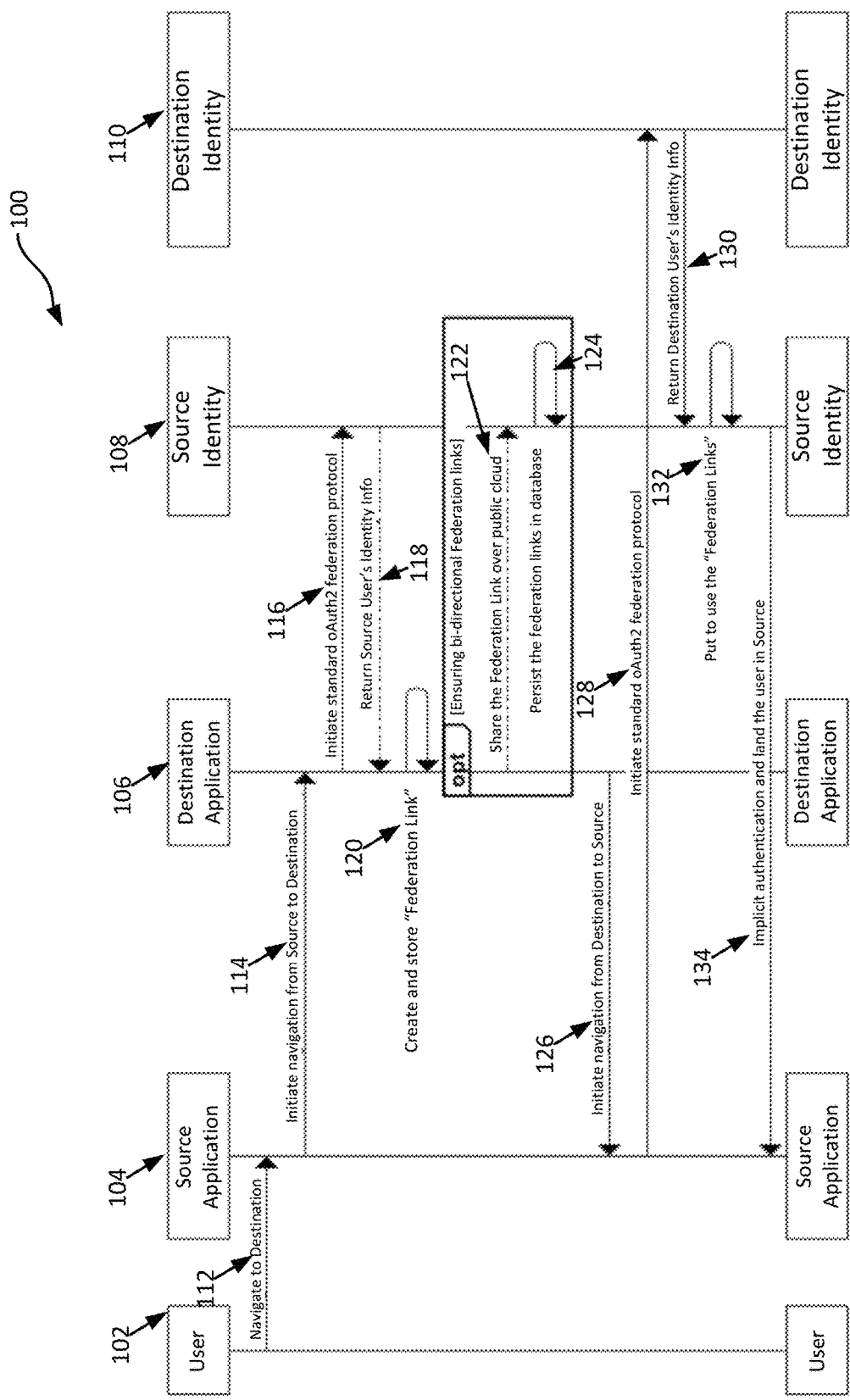
FIG. 1 shows an example method of federation link creation, sharing and utilization, based on the principles disclosed herein.

To mitigate the above deficiencies, embodiments disclosed herein leverage communications between entities to facilitate bi-directional identity federation. Particularly, identity federation results in a federation link being created on the destination application side, which is used every time a user navigates from source application to destination application. To support navigating in the other direction (i.e., from the destination application back to the source application) and to provide seamless bi-directional federation, the system and methods disclosed herein share the federation links with the source application. The result is that regardless of the side at which the federation link is created, the other side is made aware of the federation link as if it was natively created on its side. In addition, the disclosed principles utilize an additional set of security controls and guardrails to prevent account take over (ATO) or other fraudulent activity when sharing the federation link. This allows the system and methods to provide a seamless product application programming interface (API) experience for the user irrespective of the single sign-on (SSO) direction and eliminates the need to re-authenticate again.

The figures herein are described with respect to federation link methods between two specific applications and their respective authentication providers (e.g., a source application serviced by and associated with an Intuit authentication provider, and a Mailchimp application serviced by and associated with a Mailchimp authentication provider). These specific applications are chosen for ease of description. However, it is noted that the system and methods are applicable to any type and any number (2 or more) of applications and authentication providers.

For example, envision a scenario where a small business owner is using the Intuit Quickbooks online product as well the Mailchimp product. It is beneficial for SSO to be bi-directionally executed between these trusted partners (e.g., Quickbooks (Source Application)→Mailchimp SSO (Destination Application), and Mailchimp (Destination Application)→Quickbooks (Source Application) SSO). In other words, when the authenticated user navigates from Quickbooks (Source Application) to Mailchimp (Destination Application) for the first time, the standard oAuth2 protocol handshake executes such that the user authenticates on Mailchimp side for the first time. As a result, a federation link which creates a mapping between the user identities in Intuit and Mailchimp is created by the Mailchimp application. The federation link may have information, including but not limited to, user IDs and account IDs for both Intuit and Mailchimp (e.g., {"Partner": "Mailchimp", "partnerUserId": "MailchimpUserId1", "partnerAccountId": "MailchimpAccountId", "intuitUserId": "intuitUserId1", "intuitAccountId": "intuitAccountId1"}). Via this federation link, the next time when the user navigates from Quickbooks to Mailchimp, the user is able to access Mailchimp without entering login credentials. In order to facilitate similar SSO behavior when navigating from the Mailchimp→Quickbooks direction, the system shares the federation link with Mailchimp. The sharing and use of the federation link is described in detail below. It should be noted that although the examples describe the Quickbooks application as the source (with Intuit as the primary identity provider), and the Mailchimp application as the destination (with Mailchimp as the relying identity provider), the roles could be reversed.

The disclosed system and methods achieve bi-directional SSO functionality in three basic steps including: 1) creation of a "Federation Link" on the destination application side, 2) secure communication of the "Federation Link" via public cloud to source application side, and 3) the source application side using the same "Federation Link" as the destination application side to provide seamless integration experience. Expanding further on step (2), exchanging the "Federation Link" may occur when the user is present in either the Intuit or Partner (e.g., Mailchimp) side at-least once (e.g., the user is signs-on to each of the applications at least one time). As part of the secure exchange of the federation link, proof of key is provided to the receiving side via oAuth2 specification construct called idToken. In one example, idToken is a signed token (e.g., JSON Web Token (JWT)) which acts as the proof for the receiving party to validate the link and process it. In addition, prior to transmission, the system and methods ensure the federation link is encrypted (e.g., field level encrypted in addition to the envelope encryption) over the secured encrypted channel using encryption keys (e.g., public/private keys) for Application Level Encryption (ALE).

Figure 4:
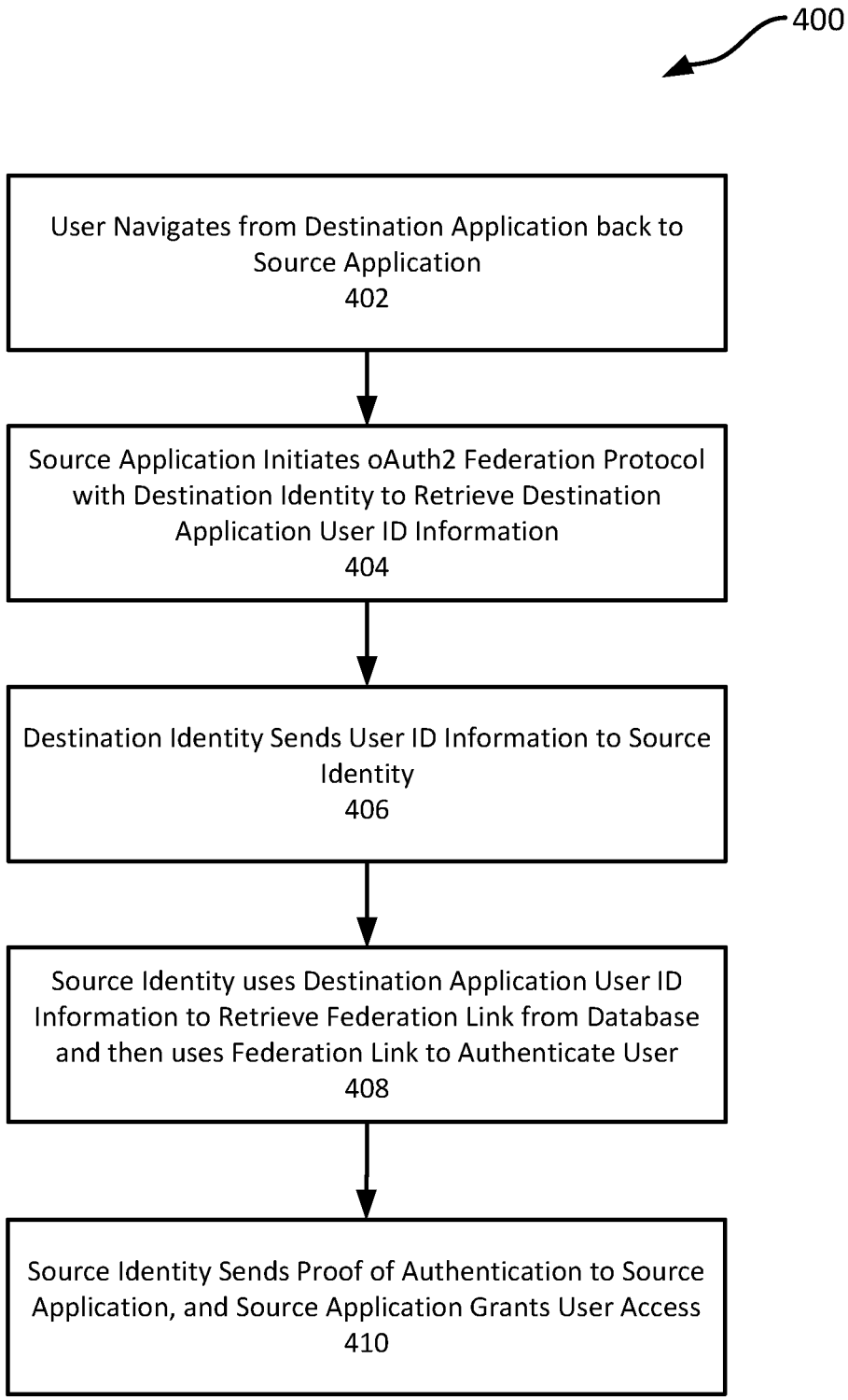
FIG. 4 shows an example method of federation link utilization, based on the principles disclosed herein.
Figure 5:
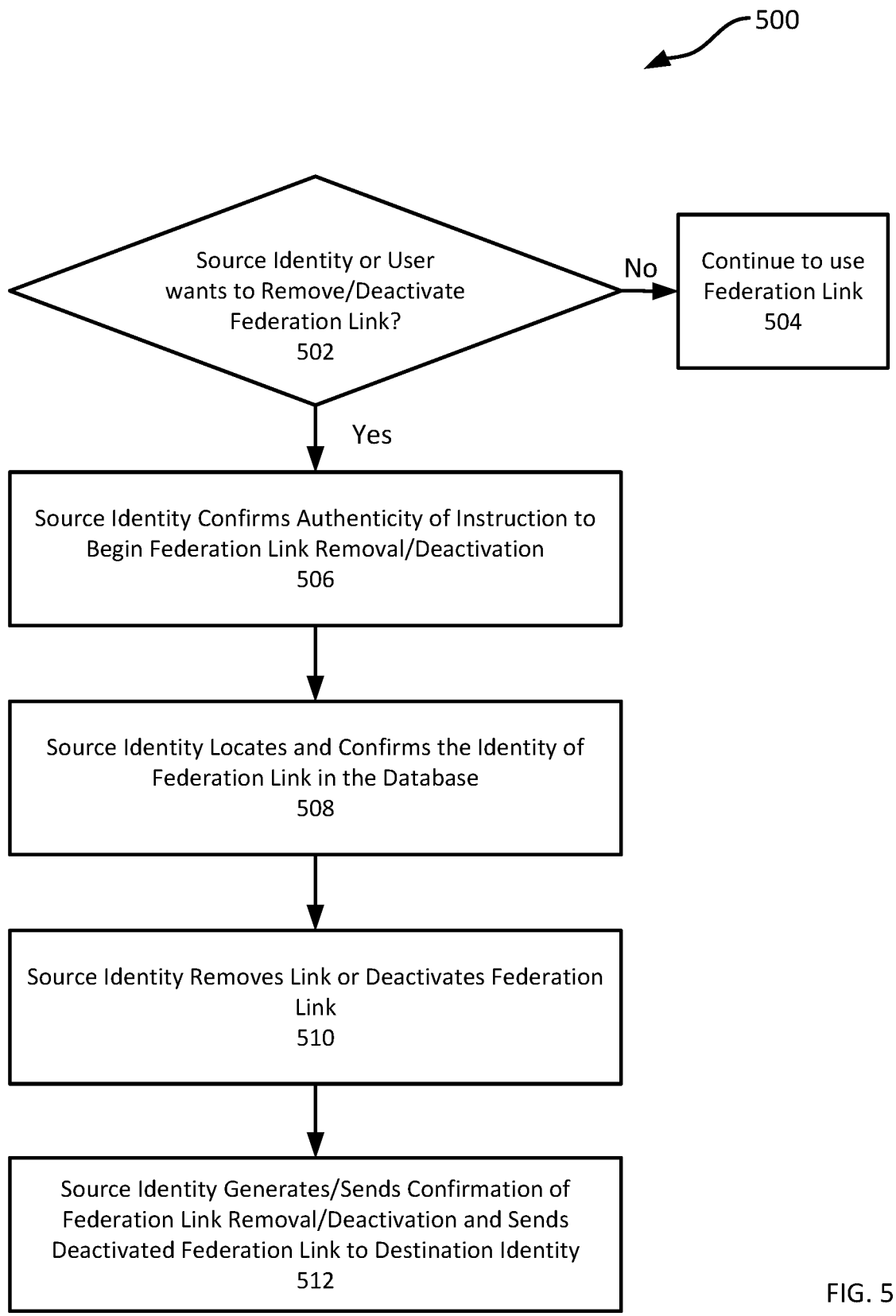
FIG. 5 shows an example method of federation link modification, based on the principles disclosed herein.
Figure 6:
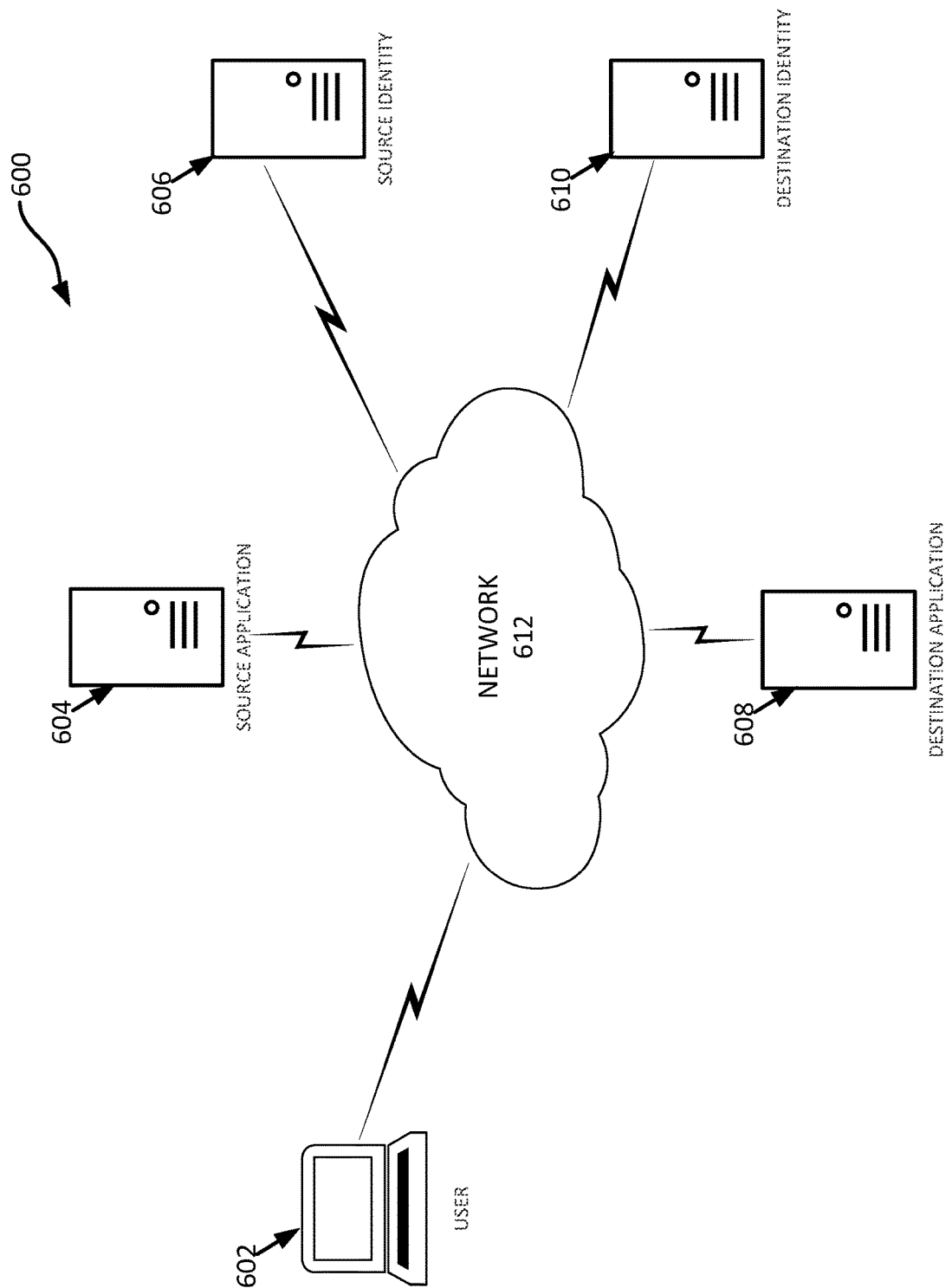
FIG. 6 shows an example of a system of computing devices that implement various features and processes, based on the principles disclosed herein.
Figure 7:
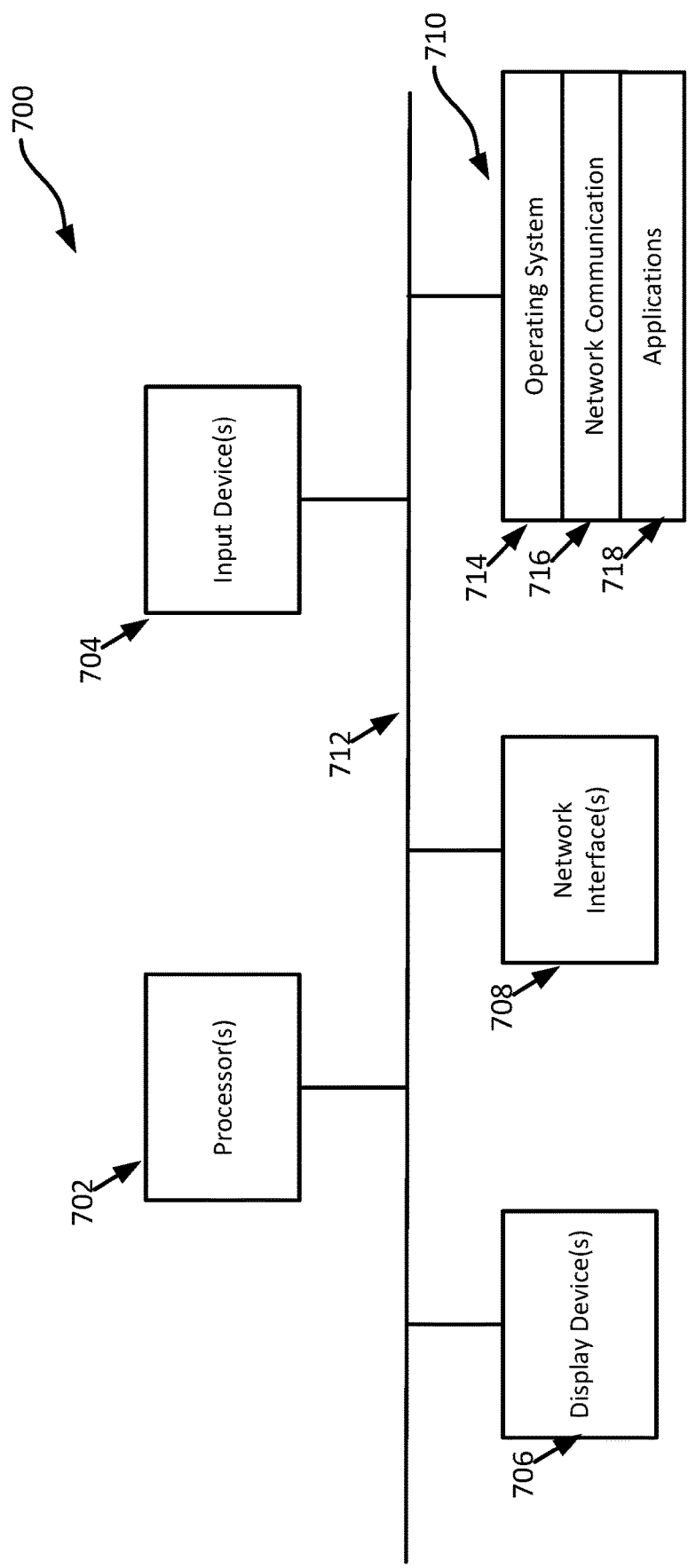
FIG. 7 shows a block diagram of an example computing device that implements various features and processes, based on the principles disclosed herein.

The above-described features are now described in detail with respect to FIGS. 1-7. Specifically, FIGS. 1-5 are flowcharts describing the example methods performed by the system, and FIGS. 6 and 7 show the example hardware for implementing the system.

FIG. 1 shows an example method 100 of federation link creation, sharing and utilization, based on the principles disclosed herein. FIG. 1 is a flowchart describing the overall creation, sharing and utilization of the federation link for facilitating bi-directional SSO functionality between two example applications managed by two different authentication providers.

The entities shown in FIG. 1 include a user 102 utilizing and navigating between two applications source application 104 (e.g. Quickbooks) and destination application 106 (e.g. Mailchimp) managed by respective authentication providers (source authentication provider 108 (e.g. Inutit) and destination authentication provider 110 (e.g. Mailchimp). In a first step 112, user 102 may navigate to source application 104 via its browser and perform authentication with source application 104. The user may navigate to trusted partner destination application 106 in step 114 and perform authentication with the destination application for the first time (e.g., enter their userID/password). It is noted that the authentication step may include user account creation and/or account sign-on. For example, if the user already has user accounts on the source application and the destination application, the authentication may include a sign-on to these accounts. However, if the user does not have accounts on the source application and/or the destination application, the authentication may include an initial user account creation step and a sign-on to the created account(s). In either case, the user is authenticated with the applications.

In step 116, destination application 106 initiates oAuth2 federation protocol, which results in source authentication provider 108 returning the user's source identity information in step 118. Once received, destination application 106 creates a federation link in step 120 that includes both the source and destination user identity information. To ensure bi-directional utilization of the federation link, destination application 106 shares the federation link with source authentication provider 108 in step 122 which is persisted throughout the databases (e.g., federation link database(s)) in step 124.

After the federation link is created and shared, both destination application 106 and source application 104 can utilize the federation link when navigating in either direction (e.g., destination application→source application and source application→destination application). For example, if the user navigates from destination application 106 to source application 104 in step 126, source application 104 initiates the oAuth2 federation protocol in step 128 with destination authentication provider 110, which sends the user's destination identity information in step 130 to source authentication provider 108. Then, in step 132, source authentication provider 108 uses the federation link to facilitate the SSO and complete the navigation from destination application to source application in step 134 (i.e., source authentication provider 108 confirms that the user is authorized by the federation link and allows automatic authentication to proceed). In the example described above, the source authentication provider 108 maintains the federation link in the database and uses the federation link in response to a request from the destination application. This effectively allows the user to navigate from the destination application back to the source application without having to sign back into the source application. Although not shown, it is noted that if the user navigates from source application 104 to destination application 106 after the federation link is created, destination application 106 simply uses the already created federation link to facilitate the automated authentication. In other words, the federation link works in both directions.

Figure 2:
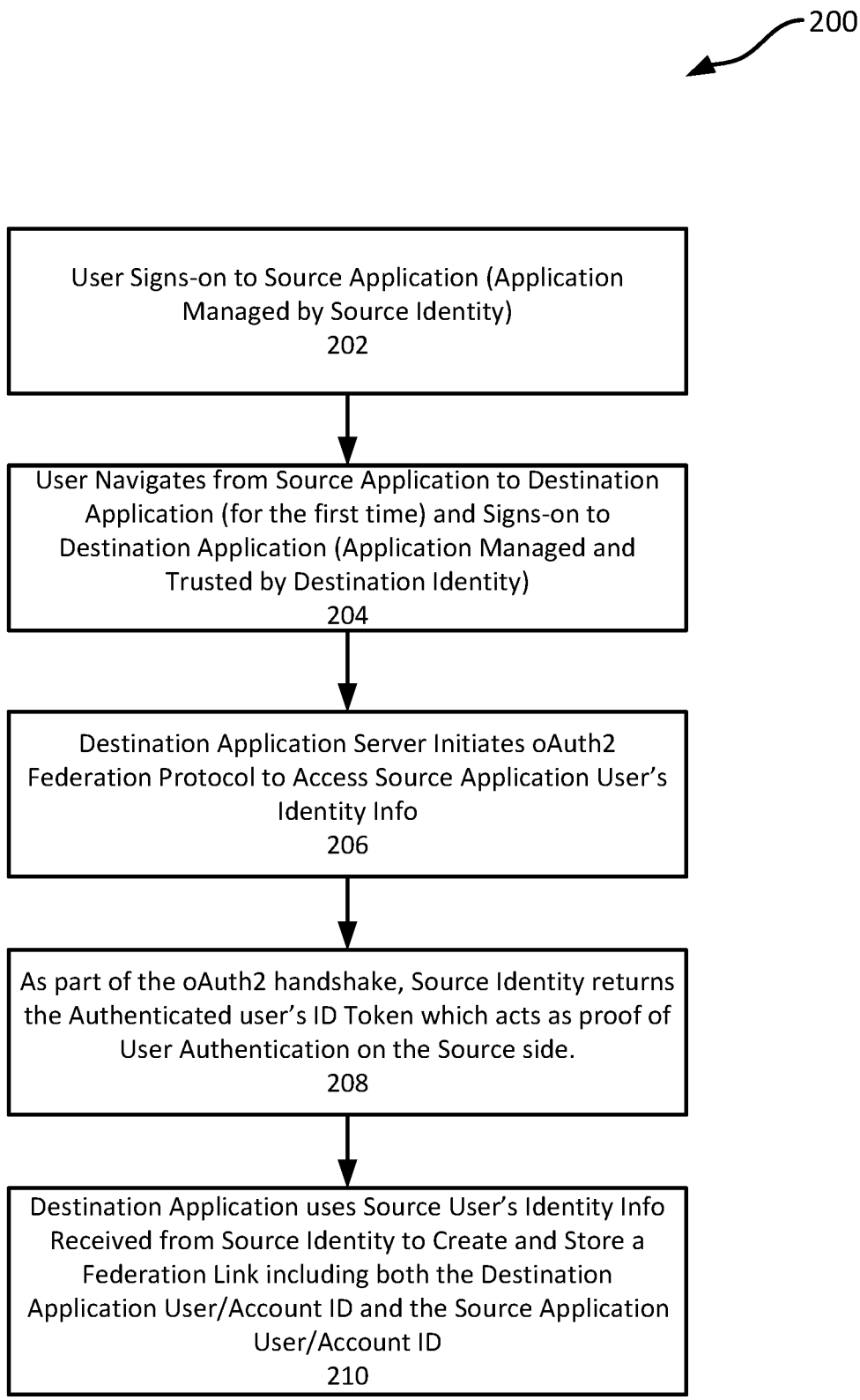
FIG. 2 shows an example method of federation link creation, based on the principles disclosed herein.
Figure 3:
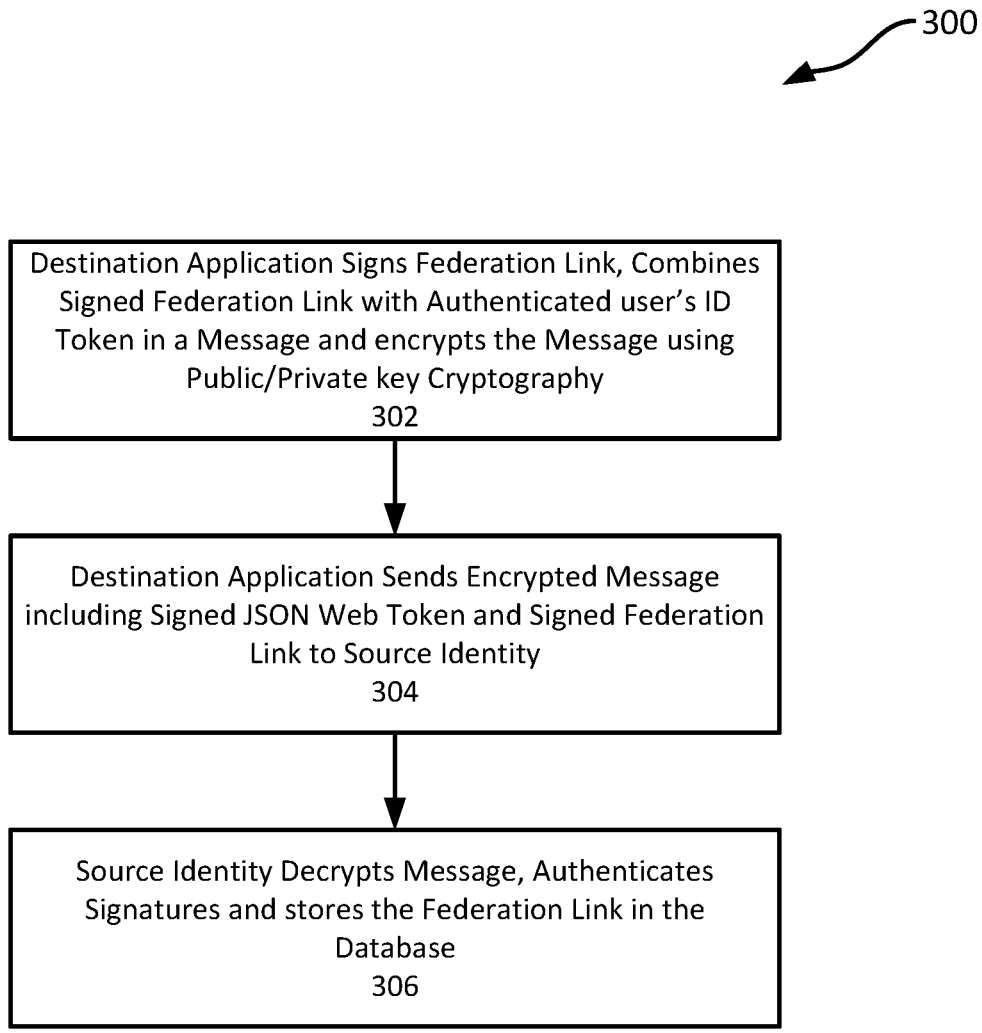
FIG. 3 shows an example method of bi-directional sharing of the federation link, based on the principles disclosed herein.

FIGS. 2-4 are flowcharts describing each stage of the overall flowchart in FIG. 1 (e.g., federation link creation, sharing and utilization). FIG. 5 is a flowchart describing additional functionality for ensuring security of the utilization of the federation link.

Specifically, FIG. 2 shows an example method 200 of federation link creation, based on the principles disclosed herein. In step 202, the user navigates to and signs on to source application 104, which is an application managed by source authentication provider 108. Once source authentication provider 108 authorizes the user, the user may want to navigate to destination application 106, which is a trusted partner application managed by destination authentication provider 110. In this example, source application 104 is referred to as the source application, while destination application 106 is referred to as the destination application. In step 204, the user navigates to destination application 106 and signs on to the destination application. Destination application 106 initiates oAuth2 federation protocol in step 206 to access user identity information stored by source authentication provider 108. In step 208, source authentication provider 108 returns the user's ID token which acts as proof indicating that the user has already been authenticated by source authentication provider 108. Since the user is determined to be authenticated by source authentication provider 108, destination application 106, in step 210, uses the user's Identity information to create and store a federation link including both the destination user/account IDs and the source user/account IDs.

Once the federation link is created and stored, the federation link may be shared with trusted partner entities. For example, destination application 106 may share the federation link with trusted partner source or any other trusted partner. FIG. 3 shows an example method 300 of bi-directional sharing of the federation link, based on the principles disclosed herein. In step 302, destination application 106 ensures the security of the federation link by signing the federation link and combining the signed federation link with the user's ID token in an encrypted message. The message may be encrypted with the public key of the recipient (e.g., source authentication provider 108). In step 304, destination application 106 sends the encrypted/signed message to source authentication provider 108, which decrypts and authenticates the message in step 306. The federation link from the message is stored in one or more databases managed by source authentication provider 108 for later use.

Once source authentication provider 108 stores federation link, it may be used for bi-directional navigation from destination application 106 back to source application 104. FIG. 4 shows an example method 400 of bi-directional utilization of the federation link, based on the principles disclosed herein. In step 402, the user navigates from destination application 106 back to source application 104. Conventionally, source application 104 would not be able to perform SSO because source application 104 would not have access to utilize the federation link. However, since the federation link is stored at source authentication provider 108, SSO from destination to source is now possible due to the principles disclosed herein. For example, in step 404, source authentication provider 108 initiates oAuth2 federation protocol with destination authentication provider 110 to retrieve the destination user ID information. This information is sent from the destination authentication provider 110 to source authentication provider 108 in step 406. In step 408, source authentication provider 108 uses the retrieved destination user ID Information to retrieve the federation link from the database and utilize the federation link to authenticate the user. The proof of authentication is sent from source authentication provider 108 to source application 104 to complete the SSO procedure in step 410.

In addition to creating, storing and using the federation link for bi-directional SSO between partnering applications, management of the federation link is beneficial to ensuring security of the system. For example, the user or the managing entity (e.g., source authentication provide 108) may determine that a breach of security has occurred and therefore the federation link poses a security risk. Thus, modification (e.g., removal/deactivation) of the federation link is possible. FIG. 5 shows an example method 500 of modification of the federation link, based on the principles disclosed herein. In step 502 it is decided if the user or the federation link managing entity (e.g., source authentication provider 108) wants to modify (e.g., remove/deactivate) the federation link. If no modification is requested, the federation link continues to be used in step 504. If a modification is requested, source authentication provider 108, in step 506, confirms the authenticity of the instruction (if from the user) to begin federation link removal/deactivation. In step 508, source authentication provider 108 confirms the identity of the federation link in the database. Then, in step 510, source authentication provider 108 removes/deactivates the federation link. The removal/deactivation may be permanent or temporary. If permanent, the system would have to go through the federation link creation/sharing process again if another federation link is desired by the user. If temporary, the federation link may become usable again after the security breach is resolved. In either case, source authentication provider 108 sends a confirmation of the federation link removal/deactivation to destination authentication provider 110 in step 512.

Again, it is noted that the methods described in FIGS. 1-5 can be performed for more than two applications, more than two authorization providers and for a plurality of users. For example, if a third application (another destination application) and third authentication provider were trusted, the third application could create and share another federation link with source authentication provider 108. This other federation link could be used for navigation back to a source application such as the destination application (e.g. Mailchimp) and/or source application (e.g. Quickbooks) described in the example above. In other words, source authentication provider 108 could store and share access to a plurality of federation links for transitioning from a plurality of destination applications to the source application, or for transitioning between the plurality of destination applications themselves. Each user of a plurality of users can therefore have one or more associated federation links stored for sharing and utilization.

FIG. 6 shows an example of a system 600 configured for creation, sharing, utilization and modification of the federation link, based on the principles disclosed herein. It should be understood that the components of the system 600 shown in FIG. 6 and described herein are merely examples and systems with additional, alternative, or fewer number of components should be considered within the scope of this disclosure.

As shown, the system 600 comprises user device 602 and servers 604-610 interconnected through a network 612. Server 604 supports operation of the source application, while server 606 facilitates authentication services for users of the source application. Similarly, server 608 supports operation of the destination application, while server 610 facilitates authentication services for users of the destination application. In the illustrated example, user device 602 is a PC but could be any device (e.g., smartphone, tablet, etc.) providing access to the servers via network 612. User device 602 has a user interface UI, which may be used to communicate with the servers using the network 612 via a browser or via software applications. The network 612 may be the Internet and or other public or private networks or combinations thereof. The network 612 therefore should be understood to include any type of circuit switching network, packet switching network, or a combination thereof. Non-limiting examples of the network 612 may include a local area network (LAN), metropolitan area network (MAN), wide area network (WAN), and the like.

Servers 604-610 and user device 602 are each depicted as single devices for ease of illustration, but those of ordinary skill in the art will appreciate that servers 604-610 and user device 602 may be embodied in different forms for different implementations. For example, any or each of the servers may include a plurality of servers including a plurality of databases, etc. Alternatively, the operations performed by any of the servers may be performed on fewer (e.g., one or two) servers. In another example, a plurality of user devices (not shown) may communicate with the servers. Furthermore, a single user may have multiple user devices (not shown), and/or there may be multiple users (not shown) each having their own respective user devices (not shown). Regardless, the hardware configuration shown in FIG. 6 may be a system that supports the functionality of the federation link creation, bi-directional sharing and bi-directional utilization shown in FIGS. 1-5.

FIG. 7 shows a block diagram of an example computing device 700 that is configured for creation, sharing, utilization and modification of a federation link, based on the principles disclosed herein. For example, computing device 700 may function as the servers 604-610 and/or user device 602, or a portion or combination thereof in some embodiments. The computing device 700 performs one or more steps of the methods shown in FIGS. 1-5. The computing device 700 is implemented on any electronic device that runs software applications derived from compiled instructions, including without limitation personal computers, servers, smart phones, media players, electronic tablets, game consoles, email devices, etc. In some implementations, the computing device 700 includes one or more processors 702, one or more input devices 704, one or more display devices 706, one or more network interfaces 708, and one or more computer-readable media 710. Each of these components is coupled by a bus 712.

Display device 706 includes any display technology, including but not limited to display devices using Liquid Crystal Display (LCD) or Light Emitting Diode (LED) technology. Processor(s) 702 uses any processor technology, including but not limited to graphics processors and multi-core processors. Input device 704 includes any known input device technology, including but not limited to a keyboard (including a virtual keyboard), mouse, track ball, and touch-sensitive pad or display. Bus 712 includes any internal or external bus technology, including but not limited to ISA, EISA, PCI, PCI Express, USB, Serial ATA or FireWire. Computer-readable medium 710 includes any non-transitory computer readable medium that provides instructions to processor(s) 702 for execution, including without limitation, non-volatile storage media (e.g., optical disks, magnetic disks, flash drives, etc.), or volatile media (e.g., SDRAM, ROM, etc.).

Computer-readable medium 710 includes various instructions 714 for implementing an operating system (e.g., Mac OS®, Windows®, Linux). The operating system may be multi-user, multiprocessing, multitasking, multithreading, real-time, and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 establish and maintain network connections (e.g., software for implementing communication protocols, such as TCP/IP, HTTP, Ethernet, telephony, etc.).

Application(s) 718 may comprise an application that uses or implements the processes described herein and/or other processes. The processes may also be implemented in the operating system.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment. In one embodiment, this may include Python. The computer programs therefore are polyglots.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random-access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a user computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include user devices and servers. A user device and server may generally be remote from each other and may typically interact through a network. The relationship of user device and server may arise by virtue of computer programs running on the respective computers and having a relationship with each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112 (f). Claims that do not expressly include the phrase "means for" or "step for" are not to be interpreted under 35 U.S.C. 112 (f).

What is claimed is:

1. A method performed by a processor, the method comprising:
   transmitting, by an authentication provider associated with a source application, a user ID token of a user to a destination application indicating that the user is authenticated by the authentication provider;
   creating, by the destination application, a federation link linking destination application authentication credentials of the user to source application authentication credentials of the user; and
   utilizing, by the destination application, the federation link to facilitate automated authentication when navigating from the destination application to the source application.

2. The method of claim 1, further comprising:
   sharing, by the destination application, the federation link with the source application by transmitting the federation link to the authentication provider associated with the source application.

3. The method of claim 2, further comprising:
   prior to sharing the federation link, encrypting and signing by the destination application, the federation link to facilitate secure communication and authentication of the federation link.

4. The method of claim 1, further comprising:
   persisting, the federation link in a federation link database of the authentication provider, the federation link database including other federation links created for other users.

5. The method of claim 1, further comprising:
   receiving, by an authentication provider associated with the destination application, a request from the source application to access the user ID token of the user navigating from the destination application to the source application; and
   in response to the request, transmitting, by the authentication provider associated with the destination application, the user ID token of the user to the authentication provider associated with the source application.

6. The method of claim 5, further comprising:
   retrieving, by the authentication provider associated with the source application, the federation link associated with the user ID token.

7. The method of claim 6, further comprising:
   facilitating, by the authentication provider associated with the source application based on the federation link, the automated authentication of the user navigating from the destination application to the source application.

8. The method of claim 1, further comprising:
   in response to a determination that the federation link poses a security risk, deactivating, by the authentication provider associated with the source application, the federation link.

9. The method of claim 8,
   wherein the determination that the federation link poses a security risk is performed by the authentication provider associated with the source application.

10. The method of claim 8,
    wherein the determination that the federation link poses a security risk is received from the source application or the destination application.

11. A system comprising:
    a non-transitory storage medium storing computer program instructions; and
    one or more processors configured to execute the computer program instructions to cause operations comprising:

transmitting, by an authentication provider associated with a source application, a user ID token of a user to a destination application indicating that the user is authenticated by the authentication provider;

creating, by the destination application, a federation link linking destination application authentication credentials of the user to source application authentication credentials of the user; and utilizing, by the destination application, the federation link to facilitate automated authentication when navigating from the destination application to the source application.

12. The system of claim 11, wherein the operations further comprise:

sharing, by the destination application, the federation link with the source application by transmitting the federation link to the authentication provider associated with the source application.

13. The system of claim 11, wherein the operations further comprise:

prior to sharing the federation link, encrypting and signing by the destination application, the federation link to facilitate secure communication and authentication of the federation link.

14. The system of claim 11, wherein the operations further comprise:

persisting, the federation link in a federation link database of the authentication provider, the federation link database including other federation links created for other users.

15. The system of claim 11, wherein the operations further comprise:

receiving, by an authentication provider associated with the destination application, a request from the source application to access the user ID token of the user navigating from the destination application to the source application; and in response to the request, transmitting, by the authentication provider associated with the destination application, the user ID token of the user to the authentication provider associated with the source application.

16. The system of claim 15, wherein the operations further comprise:

retrieving, by the authentication provider associated with the source application, the federation link associated with the user ID token.

17. The system of claim 15, wherein the operations further comprise:

facilitating, by the authentication provider associated with the source application based on the federation link, the automated authentication of the user navigating from the destination application to the source application.

18. The system of claim 11, wherein the operations further comprise:

in response to a determination that the federation link poses a security risk, deactivating, by the authentication provider associated with the source application, the federation link.

19. The system of claim 18, wherein the determination that the federation link poses a security risk is performed by the authentication provider associated with the source application.

20. A method performed by a processor, the method comprising:

determining, by an authentication provider associated with a source application, to modify a federation link linking destination application authentication credentials of a user to source application authentication credentials of the user, the federation link facilitating automated authentication when navigating from the destination application to the source application;

locating, by the authentication provider, the federation link in a database; and modifying, by the authentication provider, the federation link, wherein the modified federation link modifying the automated authentication when navigating from the destination application to the source application.

* * * * *